Aug. 30, 1938. M. S. DU PONT Re. 20,840
AERIAL BANNER
Original Filed Oct. 10, 1932 2 Sheets-Sheet 1
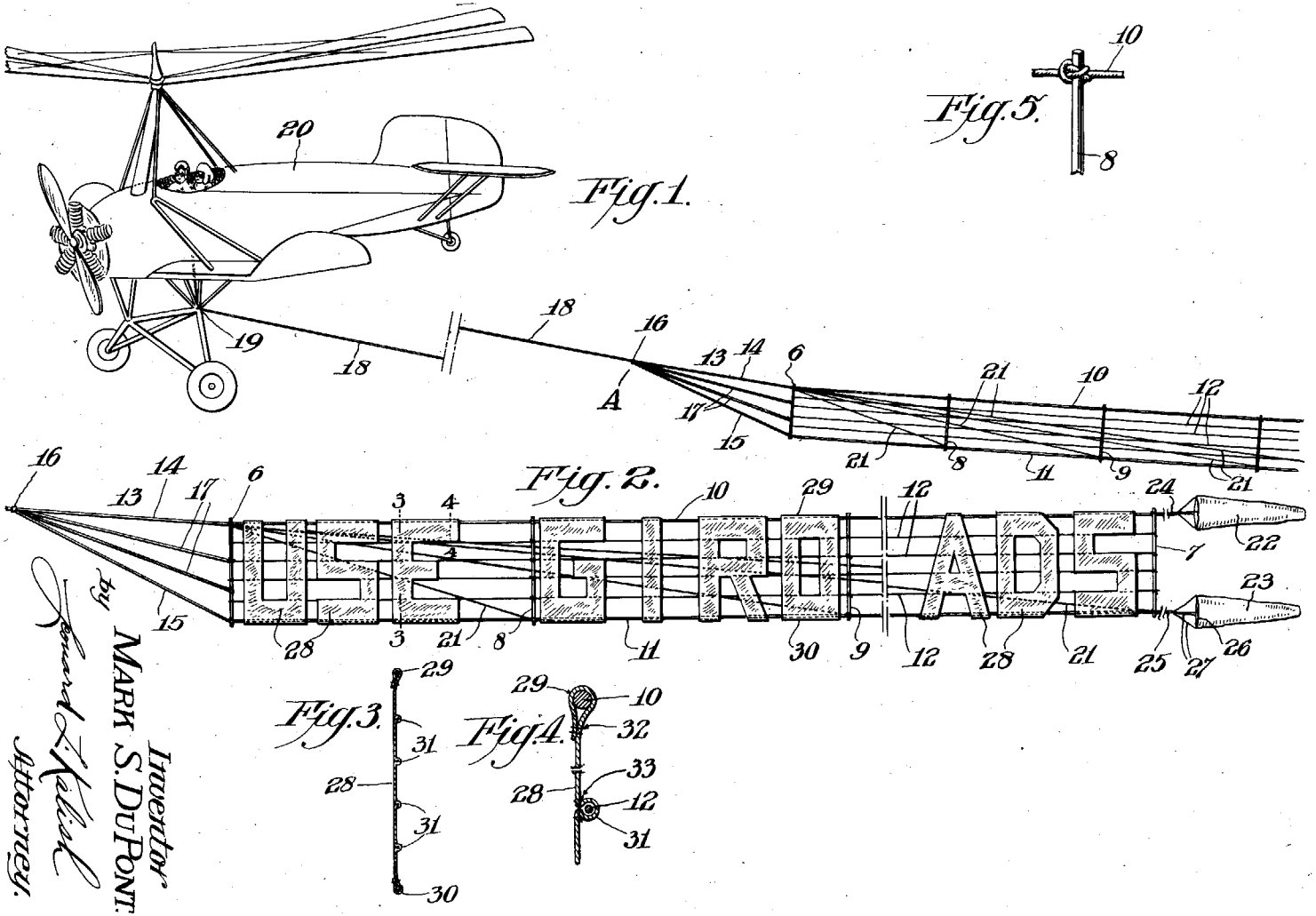
Inventor
MARK S. DUPONT
by Leonard L. Kalish
Attorney.

AERIAL BANNER
Original Filed Oct. 10, 1932 2 Sheets-Sheet 2
Fig. 6.
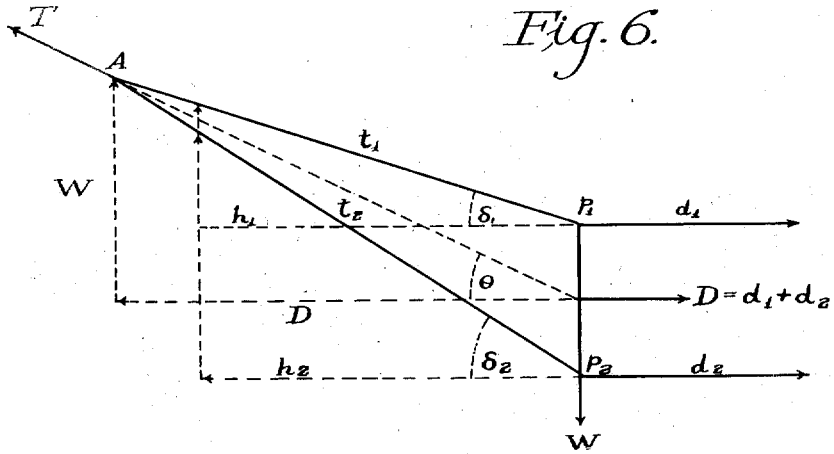
Fig. 7.
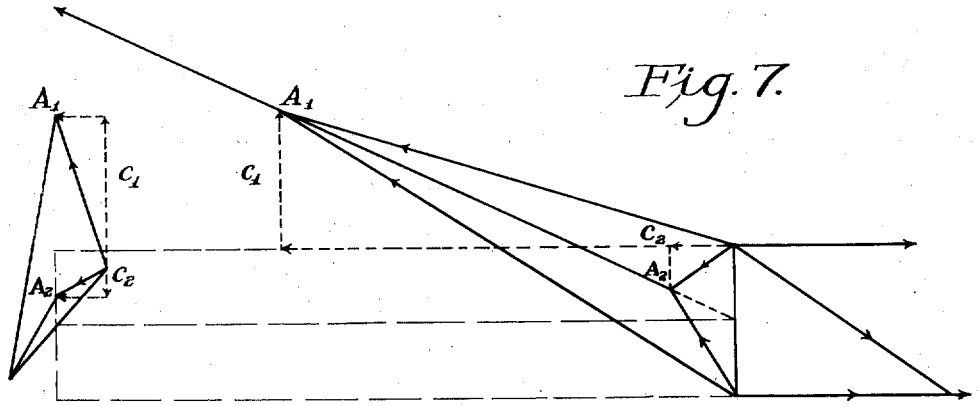
Fig. 8.
Inventor
MARK S. DU PONT.
By Leonard L. Kalish
Attorney Reissued Aug. 30, 1938

Re. 20,840

UNITED STATES PATENT OFFICE 20,840

AERIAL BANNER

Mark S. Du Pont, Darby, Pa., assignor to Kellett Autogiro Corporation, Philadelphia, Pa., a corporation of Delaware Original No. 1,901,855, dated March 14, 1933, Serial No. 637,114, October 10, 1932. Application for reissue March 15, 1933, Serial No. 660,816

16 Claims. (Cl. 40—127)

The invention relates to a new and useful construction in aerial banners and the like, and it relates more particularly to a new and useful construction in aerial banners adapted to be towed by aircraft such as aeroplanes, dirigibles, autogiros and the like.

The object of the invention is to provide an aerial banner which will offer minimum resistance or "drag", and which may be towed or flown in a generally vertical plane without any substantial twisting or distortion and which will be durable in use.

With the above and other objects in view, which will appear more fully from the following description, the aerial banner of the present invention consists of a pair of parallel main stringers extending the full length of the banner along the uppermost and lowermost edges thereof, a plurality of parallel auxiliary stringers intermediate said main stringers and also extending the full length of the banner, a plurality of generally parallel spacer bars extending transversely of said stringers at suitably spaced intervals;—there being a spacer bar along the leading edge and also along the trailing edge of said banner, and said stringers being secured to said transverse spacer bars at their points of intersection, one or more diagonal bracing cords or lines extending from the uppermost end or corner of the leading edge of the banner to the lower ends of one or more transverse spacer bars immediately behind the leading spacer bar; a bridle extending forwardly of the leading spacer bar and consisting of upper and lower bridle lines extending from the upper and lower ends of the leading spacer bar to a point of convergence (when the bridle is taut) slightly above the line of the upper edge of the banner, and one or more auxiliary bridle lines extending from said point of convergence to intermediate points along said leading spacer bar, a pair of generally tubular and rearwardly converging aero-dynamic resistance members attached to the upper and lower ends, respectively, of the trailing spacer bar, a suitable distance behind the same, by means of suitable lines, and a series of letters or other symbols formed of fabric web having generally tubular and parallel hems sewn therein, corresponding to the main and auxiliary stringers and disposed in registration therewith, and having said stringers loosely extend therethrough, with the leading ends of said tubular hems immovably affixed to said stringers.

The invention further consists of other novel features of construction which will appear more fully from the following detailed description.

For the purpose of illustrating the invention, there is shown in the accompanying drawings one form thereof, which is at present preferred, since the same has been found in practice to give satisfactory and reliable results, although it is to be understood that the various instrumentalities of which the invention consists can be variously arranged and organized, and that the invention is not limited to the precise arrangement and organization of the instrumentalities as herein shown and described.

Referring to the drawings, in which like reference characters indicate like parts, Figure 1 represents a generally perspective view, somewhat diagrammatically shown and partly broken away, illustrating a banner embodying the present invention, as the same would appear in actual use.

Figure 2 represents a side elevational view of the same, on a somewhat larger scale.

Figure 3 represents a section on line 3—3 of Figure 2, somewhat enlarged.

Figure 4 represents a section on line 4—4 of Figure 2, on a still larger scale.

Figure 5 represents a front elevational view of an upper end of a transverse spacer bar.

Figure 6 represents a diagrammatic vector analysis of a banner embodying the present invention.

Figure 7 represents another similar vector analysis under two contrasting and different conditions.

Figure 8 represents an end view of the vector analysis of Figure 7, showing, in end elevation, the result of a lateral disturbance by an external force in the unstable one of the two conditions illustrated.

In carrying out the invention, a spacer bar 6 is provided along the leading edge and a spacer bar 7 is provided along the trailing edge of the banner, with any suitable number of intermediate spacer bars 8 and 9 disposed at suitable intervals between the leading and trailing spacer bars 6 and 7, respectively.

To the upper ends of the spacer bars 6, 7, 8 and 9, and any others which may be employed, depending upon the length of the banner, an upper main stringer 10 and a lower main stringer 11 is secured in any suitable manner, as for instance, that shown in Figure 5, and a suitable number of intermediate stringers 12, of lesser thickness or weight, are also similarly secured to the spacer bars and are spaced from each other at suitable intervals.

From the front or leading spacer bar 6, a bridle 13 is extended in a forward direction, consisting of the upper and lower main bridle lines 14 and 15, respectively, extending from the upper and lower ends of the leading spacer bar 6, respectively, and converging to a common juncture 16, which in the taut condition of the bridle and banner is disposed somewhat above the line of the upper main stringer 10. A suitable number of auxiliary bridle lines 17 may also be provided intermediate the leading spacer bar 6 and the juncture 16, as shown particularly in Figures 1 and 2.

From the juncture 16 the tow line 18 is extended, to a suitable point 19 on the fuselage or on the under-carriage of the aircraft 20, where it is detachably secured by any suitable means adapted for the quick releasing of the tow-line 18 and the banner towed thereby, at the will of the pilot or operator.

From the upper end of the leading spacer bar 6, one or more diagonal brace lines 21 are extended to the lower ends of the immediately succeeding intermediate spacer bars 8 and 9, and any others which may follow;—the diagonal extending to the lower end of the foremost of the intermediate spacer bars being more essential than the diagonal extending to each succeeding spacer bar.

To the upper end and to the lower end of the trailing spacer bar 7 a pair of aero-dynamic resistance elements 22 and 23 are secured by means of suitable lines 24 and 25, respectively, at a suitable distance behind said spacer bar 7. The resistance elements 22 and 23 are generally tubular formations composed of suitable fabrics, such as canvas or the like, and are open at both ends and converge or taper towards their trailing ends, while to the leading ends thereof annular or hoop-like members 26 are secured for maintaining the leading ends thereof open at all times, and a plurality of converging lines 27 are extended from said annular hoop-like rim members 26 to the tow lines 24 and 25, which carry said resistance members.

The letters or other symbols 28 are formed of suitable textile webbing, such as woven silk, woven canvas or the like, and each letter or symbol 28 is provided with a series of spaced parallel tubular hems 29, 30 and 31, through which the stringers 10, 11, and 12 are extended, as indicated particularly in Figures 3 and 4. The tubular hems 29, 30 and 31 are sewn in a manner particularly indicated in Figure 4, by suitable lines of sewn stitches 32 and 33.

The stringers 10, 11 and 12 extend through said tubular hems generally loosely, and the front or leading ends of said tubular hems are then fixedly secured to said stringers by suitable binding threads sewn through said hems and sewn through or fastened to said stringers. By this means the leading edge of each letter is fixedly secured to the stringers, while the trailing portion of each letter is slidably disposed upon the stringers by means of the tubular hems through which said stringers extend.

By means of the aerial banner of the present construction, the aero-dynamic resistance offered by the entire banner is reduced to a minimum, and the stability of the banner in a generally upright plane is assured, so that the letters, symbols or description carried by the banner may be maintained in a most legible position with respect to observers on the ground.

If desired, letters or other similar characters or symbols may be employed which are of a height less than the height of the banner, and so too, if desired, two lines of letters may be superimposed upon each other throughout the length of the banner or through a portion of the banner.

*Operation*

In towed flight, the aerial banner of the present invention will be subjected to certain mechanical and aerodynamic forces. It will have constant weight, W, and constant resistance, D, (Figure 6) for any particular velocity. The resistance, D, will, at this velocity, be equal to the horizontal component of the thrust, T, in the tow line 18. The tow line 18 will form an angle $\theta$ to the horizontal which may be defined by the expression:

$$\theta=\left(\tan^{-1}\cdot\frac{W}{D}\right)$$

then $$T=\frac{D}{\cos\left(\tan^{-1}\cdot\frac{W}{D}\right)}$$

$$=\frac{D}{\cos\theta}$$

For equilibrium in flight, the bridle lines $t_1$ $t_2$ (Figures 6 and 7) leading respectively from the upper and lower extremities of the spacer bar or mast 6, must be of such lenghs that the numerous possible positions of the bridle juncture point A lie on a locus which subtends an angle equal to $\theta$ with the midpoint of the mast 6.

The exact location of A controls the stability of the banner. Figures 7 and 8 show two possible positions by way of illustration. The downward vertical component, $c_2$, of the line tension in the case of the short bridle ($A_2$) is shown to be such as to further disturb the banner laterally, whenever an external force has initiated an angular displacement. Except for large angles of angular displacement, this condition is unstable.

In the case of the long bridle, having its juncture point 16 at A, the upward vertical component of the bridle line tension is corrective and provides the desirable lateral stability of the banner in flight. It will be observed that positive lateral stability exists only when the bridle point is above the upper banner line. Neutral stability exists when this point lies directly on the extension of this line, while a condition of instability prevails for all but large angles of lateral displacement when the bridle point 16 comes below the upper horizontal line of the banner, as at $A_2$.

The main bridle lines carry equal tension ($t_1=t_2=T/2$), the horizontal components ($h_1$, $h_2$) of which must, for equilibrium, be equal to the resistances $d_1$ and $d_2$ respectively, and the sum of these will equal the total drag, D, of the banner.

Thus, $$t_1=\frac{h_1}{\cos\delta_1}$$

and $$t_2=\frac{h_2}{\cos\delta_2}$$

by hypothesis $$t_1=t_2$$

$$\therefore\frac{h_1}{\cos\delta_1}=\frac{h_2}{\cos\delta_2}$$

yet $$\delta_1<\delta_2$$

$$\therefore h_1>h_2$$

$$\therefore h_1>d_1 \text{ and } h_2<d_2$$

From Figures 2 and 6 it will be seen that the difference between the horizontal components of the tensions in upper and lower bridle lines becomes less as the length of the bridle increases, But there is a practical limit which the length of the bridle cannot exceed. One or more diagonal lines 21 are provided for the purpose of transferring from the lower point, $p_2$, of the spacer bar or mast 6, to the upper point, $p_1$ thereof, that proportion of the drag, $d_2$, by which $d_2$ exceeds $h_2$ (Figure 6). It will be seen, therefore, that the necessity of the diagonal bracing becomes less as the length of the bridle increases and $d_1$ approaches equality with $d_2$. These two angles will be of equal magnitude when the bridle length becomes equal to infinity.

Applicant is aware that the invention may be embodied in other specific forms without departing from the spirit or essential attributes thereof, and it is therefore desired that the present embodiment be considered in all respects as illustrative and not restrictive, reference being had to the appended claims rather than to the foregoing description to indicate the scope of the invention.

Having thus described the invention, what is hereby claimed as new and desired to be secured by Letters Patent, is:

1. An aerial banner including a plurality of generally parallel stringers extending longitudinally of the banner, a plurality of spacer bars suitably spaced with respect to each other, and extending generally transversely of said stringers and secured thereto at their points of intersection;—there being a spacer bar along the leading edge of said banner and another spacer bar along the trailing edge thereof, a tow line, and a bridle intermediate said tow line and said leading spacer bar, said bridle including an upper and a lower line extending generally from the upper and lower ends, respectively, of said leading spacer bar, to a common juncture with said tow line, for transmitting the towing forces to the uppermost and lowermost stringers, respectively, said upper bridle line being inclined upwardly with respect to said stringers when the bridle is taut;—with the juncture point of the bridle being above the line of the upper stringer, and a pair of aero-dynamic resistance members secured to and a suitable distance behind the trailing spacer bar, near the upper and lower ends thereof.

2. An aerial banner including a plurality of generally parallel stringers extending longitudinally of the banner, a plurality of spacer bars suitably spaced with respect to each other, and extending generally transversely of said stringers and secured thereto at their points of intersection;—there being a spacer bar along the leading edge of said banner and another spacer bar along the trailing edge thereof, a tow line, and a bridle intermediate said tow line and said leading spacer bar, said bridle including an upper and a lower line extending generally from the upper and lower ends, respectively, of said leading spacer bar, to a common juncture with said tow line, for transmitting the towing forces to the uppermost and lowermost stringers, respectively, said upper bridle line being inclined upwardly with respect to said stringers when the bridle is taut;—with the juncture point of the bridle being above the line of the upper stringer, a pair of aero-dynamic resistance members secured to and a suitable distance behind the trailing spacer bar, near the upper and lower ends thereof, and a diagonal tension member operatively interconnecting the upper main bridle line with the lower end of the intermediate spacer bar.

3. An aerial banner including a plurality of generally parallel stringers extending longitudinally of the banner, a plurality of spacer bars suitably spaced with respect to each other, and extending generally transversely of said stringers and secured thereto at their points of intersection;—there being a spacer bar along the leading edge of said banner and another spacer bar along the trailing edge thereof, a tow line, and a bridle intermediate said tow line and said leading spacer bar, said bridle including an upper and a lower line extending generally from the upper and lower ends respectively, of said leading spacer bar, to a common juncture with said tow line, for transmitting the towing forces to the uppermost and lowermost stringers, respectively, a pair of aero-dynamic resistance members secured to and a suitable distance behind the trailing spacer bar, near the upper and lower ends thereof, a diagonal tension member operatively interconnecting the upper main bridle line with the lower end of an intermediate spacer bar, and a plurality of symbols formed of thin textile webbing mounted upon said stringers, having a plurality of parallel and generally tubular hems sewed therein, through which said stringers are loosely extended; the leading ends of said tubular hems being fixedly secured to said stringers.

4. An aerial banner including a plurality of generally parallel stringers extending longitudinally of the banner, a plurality of spacer bars suitably spaced with respect to each other and extending generally transversely of said stringers and secured thereto at their points of intersection;—there being a spacer bar along the leading edge of said banner and another spacer bar near the trailing edge thereof, a tow line adapted to be attached to an aircraft, a bridle intermediate said tow line and said leading spacer bar, said bridle including an upper and a lower line extending generally from the upper and lower ends, respectively, of said leading spacer bar, to a common juncture with said tow line, for transmitting the towing forces to the uppermost and lowermost stringers, respectively, said upper bridle line being inclined upwardly with respect to said stringers when the bridle is taut, and said juncture being above the line of the upper stringer and a diagonal tension member operatively interconnecting the upper bridle line with the lower end of an intermediate spacer bar, and a plurality of symbols formed of webbing, mounted upon the said stringer.

5. An aerial banner including a plurality of generally parallel stringers extending longitudinally of the banner, a plurality of spacer bars suitably spaced with respect to each other and extending generally transversely of said stringers and secured thereto at their points of intersection;—there being a spacer bar along the trailing edge thereof, a tow line adapted to be attached to an aircraft, a bridle intermediate said tow line and said leading spacer bar, said bridle including an upper and a lower line extending generally from the upper and lower ends, respectively, of said leading spacer bar, to a common juncture with said tow line, for transmitting the towing forces to the uppermost and lowermost stringers, respectively, said upper bridle line being inclined upwardly with respect to said stringers when the bridle is taut, and said juncture being above the line of the upper stringer and a diagonal tension member operatively interconnecting the upper bridle line with the lower end of an intermediate spacer bar, a plurality of symbols formed of webbing, mounted upon the said stringers, and aerodynamic resistance means secured to the end of the banner behind the trailing end thereof by tension members, for exerting a generally similar force upon the uppermost and lowermost stringers of the banner.

6. In combination with an aircraft, of an aerial banner, including a plurality of generally parallel stringers extending longitudinally of the banner, a plurality of spacer bars suitably spaced with respect to each other and extending generally transversely of said stringers and secured thereto at their points of intersection, there being a spacer bar along the leading edge of said banner and another spacer bar along the trailing edge thereof, a tow line, adapted to be detachably secured to the fuselage of said aircraft, and being detachably secured thereto and detachable therefrom while in towed flight, an upper bridle line extending from said tow line generally to the upper end of the leading spacer bar at an angle to the stringers, a lower bridle line extending from said tow line generally to the lower end of said leading spacer bar, the juncture of said tow line and said bridle line being above the line of the upper stringer, and a diagonal tension member operatively interconnecting the upper bridle line with the lower end of an intermediate spacer bar, thereby to transmit some of the force of the upper bridle line to a lower stringer, at a point behind the leading spacer bar.

7. In combination with an aircraft, of an aerial banner, including a plurality of generally parallel stringers extending longitudinally of the banner, a plurality of spacer bars suitably spaced with respect to each other and extending generally transversely of said stringers and secured thereto at their points of intersection, there being a spacer bar along the leading edge of said banner and another spacer bar along the trailing edge thereof, a tow line, adapted to be detachably secured to the fuselage of said aircraft, and being detachably secured thereto while in towed flight, an upper bridle line extending from said tow line generally to the upper end of the leading spacer bar at an angle to the stringers, a lower bridle line extending from said tow line generally to the lower end of said leading spacer bar, a diagonal tension member operatively interconnecting the upper bridle line with the lower end of an intermediate spacer bar, thereby to transmit some of the force of the upper bridle line to a lower stringer, at a point behind the leading spacer bar, and a plurality of symbols formed of webbing mounted upon said stringers, said symbols embracing said stringers generally continuously throughout the zones where the symbols overlap said stringers, the leading edges of said symbols being affixed to said stringers.

8. An aerial banner including a plurality of generally parallel stringers extending longitudinally of the banner, a plurality of spacer bars suitably spaced with respect to each other, and extending generally transversely of said stringers and secured thereto at their points of intersection;—there being a spacer bar along the leading edge of said banner and another spacer bar along the trailing edge thereof, a tow line, and a bridle intermediate said tow line and said leading spacer bar, said bridle including an upper and a lower line extending generally from the upper and lower ends, respectively, of said leading spacer bar, to a common juncture with said tow line, for transmitting the towing forces to the uppermost and lowermost stringers, respectively, said upper bridle line being inclined upwardly with respect to said stringers when the banner is in towed flight;—with the juncture point of the bridle being above the line of the upper stringer, and a pair of aero-dynamic resistance members secured to and a suitable distance behind the trailing spacer bar, near the upper and lower ends thereof.

9. An aerial banner including a plurality of generally parallel stringers extending longitudinally of the banner, a plurality of spacer bars suitably spaced with respect to each other and extending generally transversely of said stringers and secured thereto at their points of intersection;—there being a spacer bar along the leading edge of said banner and another spacer bar near the trailing edge thereof, a tow line adapted to be attached to an aircraft, a bridle intermediate said tow line and said leading spacer bar, said bridle including an upper and a lower line extending generally from the upper and lower ends, respectively, of said leading spacer bar, to a common juncture with said tow line, for transmitting the towing forces to the uppermost and lowermost stringers, respectively, said upper bridle line being inclined upwardly with respect to said stringers and said juncture being above the line of the upper stringer when the banner is in towed flight, and a diagonal tension member operatively interconnecting the upper bridle line with the lower end of an intermediate spacer bar, and a plurality of symbols mounted upon the said stringer.

10. An aerial banner including a plurality of generally parallel stringers extending longitudinally of the banner, a plurality of spacer bars suitably spaced with respect to each other and extending generally transversely of said stringers and secured thereto at their points of intersection;—there being a spacer bar along the trailing edge thereof, a tow line adapted to be attached to an aircraft, a bridle intermediate said tow line and said leading spacer bar, said bridle including an upper and a lower line extending generally from the upper and lower ends, respectively, of said leading spacer bar, to a common juncture with said tow line, for transmitting the towing forces to the uppermost and lowermost stringers, respectively, said upper bridle line being inclined upwardly with respect to said stringers and said juncture being above the line of the upper stringer when the banner is in towed flight, and a diagonal tension member operatively interconnecting the upper bridle with the lower end of an intermediate spacer bar, a plurality of symbols mounted upon the said stringers, and aerodynamic resistance means secured to the end of the banner a suitable distance behind the trailing end thereof by suitable tension members, for exerting a generally similar force upon the uppermost and lowermost stringers of the banner.

11. An aerial banner including a plurality of generally parallel stringers extending longitudinally of the banner, a plurality of spacer bars suitably spaced with respect to each other and extending generally transversely with respect to said stringers and secured thereto at their points of intersection, there being a spacer bar along the leading edge of said banner, a tow line, a bridle intermediate said tow line and said spacer bar, said bridle including an upper and a lower bridle line extending generally from the upper and lower ends, respectively, of said leading spacer bar, to a generally common juncture with said tow line, for transmitting the towing forces to the upper and lower portions of the banner, the upper bridle line being longer than the distance between the juncture of the leading spacer bar and the upper bridle line, and the juncture of the leading spacer bar and the lower bridle line, a diagonal tension member operatively interconnecting the upper main bridle line with the lower end of an intermediate spacer bar, an aerodynamic resistance member secured to the rear end of the banner, and a plurality of suitable letters or other symbols carried by said stringers.

12. An aerial banner including a plurality of generally parallel stringers extending longitudinally of the banner, a plurality of spacer bars suitably spaced with respect to each other and extending generally transversely with respect to said stringers and secured thereto at their points of intersection, there being a spacer bar along the leading edge of said banner, a tow line, a bridle intermediate said tow line and said spacer bar, said bridle including an upper and a lower bridle line extending generally from the upper and lower ends, respectively, of said leading spacer bar, to a generally common juncture with said tow line for transmitting the towing forces to the upper and lower portions of the banner; the included angle between the upper bridle line and the leading spacer bar being an obtuse angle when the bridle and banner are in a uniformly taut condition, a diagonal tension member operatively interconnecting the upper main bridle line with the lower end of an intermediate spacer bar, an aerodynamic resistance member secured to the rear end of the banner, and a plurality of suitable letters or other symbols carried by said stringers.

13. An aerial banner adapted for towed flight, including a plurality of generally parallel stringers extending longitudinally of the banner, a plurality of spacer bars suitably spaced with respect to each other, and extending generally transversely of said stringers and secured thereto at their points of intersection;—there being a spacer bar along the leading edge of said banner, a tow line, and a bridle intermediate said tow line and said leading spacer bar, said bridle including an upper and a lower line extending generally from the upper and lower terminal portions, respectively, of said leading spacer bar, to a generally common juncture with said tow line, for transmitting the towing forces to the uppermost and lowermost stringers, respectively, said upper bridle line being inclined upwardly with respect to said stringers when the bridle is taut;—with the juncture point of the bridle being above the line of the upper stringer, and aero-dynamic means secured to the trailing end of the banner for exerting tension upon said stringers when the banner is in towed flight.

14. An aerial banner adapted for towed flight including a plurality of generally parallel stringers extending longitudinally of the banner, a plurality of spacer bars suitably spaced with respect to each other and extending generally transversely with respect to said stringers and secured thereto at their points of intersection, there being a spacer bar along the leading edge of said banner, a tow line, a bridle intermediate said tow line and said spacer bar, said bridle including an upper and a lower bridle line extending generally from the upper and lower ends, respectively, of said leading spacer bar, to a generally common juncture with said tow line for transmitting the towing forces to the upper and lower portions of the banner; the included angle between the upper bridle line and the leading spacer bar being an obtuse angle when the bridle and banner are in a uniformly taut condition, aerodynamic resistance means secured to the rear end of the banner for exerting tension upon said stringers when the banner is in towed flight, and a plurality of suitable letters or other symbols carried by said stringers.

15. An aerial banner adapted for towed flight, including a plurality of generally parallel stringers extending longitudinally of the banner, a plurality of spacer bars suitably spaced with respect to each other and extending generally transversely of said stringers and secured thereto, a plurality of suitable letters or other symbols carried by said stringers generally in the plane thereof and being slidably connected with said stringers generally throughout the zones where the symbols overlap said stringers, and having their leading edges secured against sliding on said stringers, whereby said stringers may tend to hold said letters or symbols against free flapping and may tend to minimize bagging in said letters or symbols, while the banner is in towed flight, and means for connecting said aerial banner to an aerial vehicle.

16. An aerial banner adapted to be towed by a moving air vehicle, including a plurality of generally parallel stringers extending longitudinally of the banner, a plurality of spacer bars suitably spaced with respect to each other and extending generally transversely of said stringers and secured thereto generally at their points of intersection, a tow line adapted to connect the banner to an air vehicle, a plurality of symbols formed of webbing mounted upon said stringers, and means associated with said symbols, embracing said stringers generally continuously throughout the zones where the symbols overlap said stringers and being slidable with respect thereto, except at the leading edges thereof; the leading edges of said symbols being affixed to said stringers against sliding with respect thereto.

MARK S. DU PONT.